July 25, 1933. J. MORICCA 1,920,099
COMBINED SHADE AND GUIDE MAP
Filed June 17, 1931
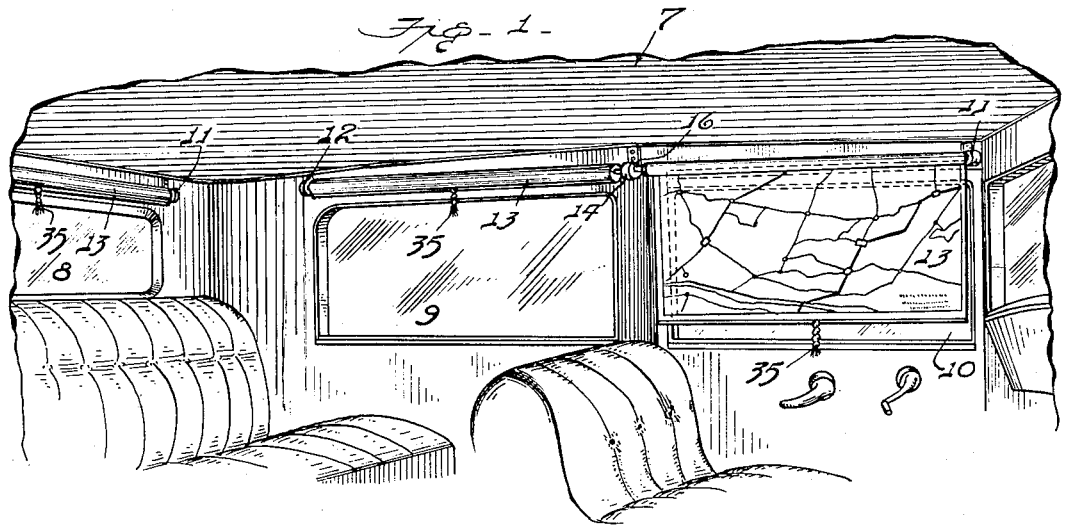
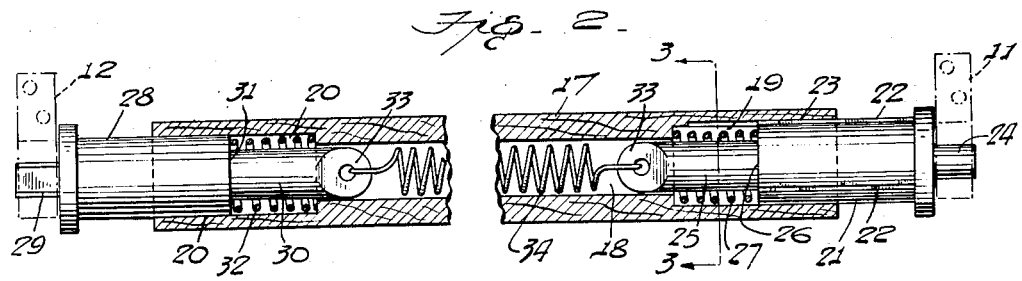
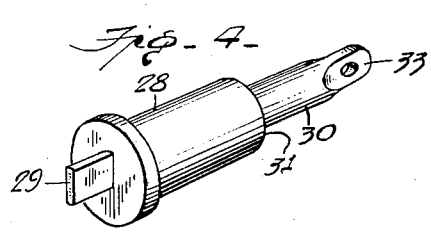
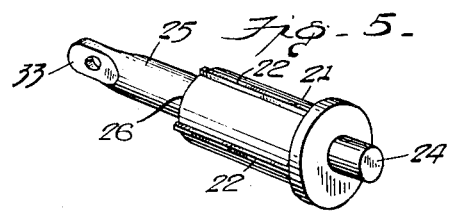
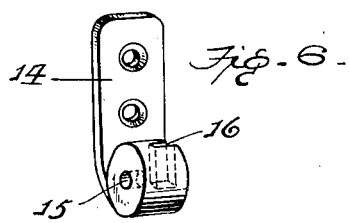
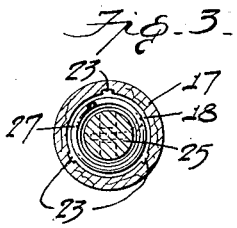
Inventor
Joseph Moricca
By John Milton Jester
Attorney Patented July 25, 1933

1,920,099

UNITED STATES PATENT OFFICE

JOSEPH MORICCA, OF OLEAN, NEW YORK, ASSIGNOR OF FORTY-NINE PER CENT TO PETER LISA, CARMELO REITANO, AND LIBERATORE FRATERANGELO, ALL OF OLEAN, NEW YORK

COMBINED SHADE AND GUIDE MAP

Application filed June 17, 1931. Serial No. 545,091.

The invention relates to accessories for motor or other vehicles but particularly for automobiles.

The principal object of the invention, generally stated, is to provide a combined window shade and guide map carried by a spring roller and adapted to be mounted above the windows of an automobile, the intention being that a vehicle be equipped with a combined shade and map at each window, all being interchangeable whereby any selected or desired map may be located at the window to the left of the driver in a readily accessible position so that it may be pulled down or extended for inspection whenever such is necessary.

It is well known that shade rollers for use at the different windows in an automobile are not necessarily of the same length and that the shades and rollers for the corresponding windows in different makes of cars also vary. It is consequently an important object of the present invention to provide a combined shade and map mounted upon a spring roller which is adjustable as to length so that a plurality of such rollers may be mounted interchangeably at any of the windows in a certain automobile or at the windows of an automobile of different make, the extensibility or adjustability of the roller compensating for differences in the dimensions of the windows so that a given set of map carrying rollers may be used, if not everywhere, at least in connection with a large number of different makes of automobiles and different body styles.

Another object of the invention is to provide an arrangement of this character in which the supporting spring roller may in some instances be mounted in the usual type of brackets without change in the equipment of an automobile other than the provision of brackets over those windows which are not ordinarily thus equipped, it being well known that it is generally customary to provide shades only at the back window and the two rear side windows.

Another object of the invention is to provide an arrangement of this character wherein use may be made of a special bracket where there is but little space between the side windows, the special bracket having means at one side for journally receiving the trunnion of a shade roller and provided at its opposite side with a socket for receiving the gudgeon of an adjacent roller so that two rollers may be supported at one end by a single bracket in cases where there is insufficient room to accommodate two separate brackets.

A further object is to provide a guide map device which may be used in the same manner as an ordinary shade and which, moreover, may be manufactured at comparatively slight cost.

An additional object is to provide a device of this character which will be very simple, neat and attractive in appearance, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a perspective view showing a portion of the interior of an automobile equipped at its windows with my combined shade and map, Figure 2 is a longitudinal section through one form of shade roller which is extensible or automatically adjustable, Figure 3 is a cross section taken on the line 3—3 of Figure 2, Figure 4 is a detail perspective view of the gudgeon end of the roller, Figure 5 is a perspective view of the trunnion end, and Figure 6 is a perspective view of a novel combination bracket.

Referring more particularly to the drawing the numeral 7 designates a portion of an automobile having the usual rear window 8 and side windows 9 and 10. The particular style of body illustrated is the coach wherein there are only two side windows but it will of course be distinctly understood that the invention is capable of application to any other style of body, including the coupé, sedan or limousine, this being immaterial. It is customary to provide shades carried by spring rollers mounted at the rear window 8 and the rear side windows 9, the shades being mounted in conventional brackets 11 and 12, the former being of the type to journally receive the trunnion provided at the end of a shade roller and the latter being slotted or socketed to receive the gudgeon. Ordinarily the shades are mounted on the usual and well known spring rollers and are formed of cloth or other suitable material and are used for the purpose of excluding sunlight or glare from any source.

In the carrying out of my invention I provide maps upon the shades so that they may perform a twofold function, it being of course apparent that the provision of the maps does not in any way interfere with the customary purpose of the shades. The shades may be of any material and the maps may be printed upon them or applied in any preferred manner. It is the intention to provide one of these combined shades and maps 13 at each window, the only necessary extra equipment being roller supporting brackets over each window not so originally equipped.

In many cars the side windows are close together and it is easily possible that there might not be room enough to accommodate separate brackets of the conventional type such as those illustrated at 11 and 12. Under such circumstances I may use the special bracket 14 illustrated in detail in Figure 6, this bracket being adapted to be mounted upon the side of the car between the windows and having an enlarged lower portion formed at one side with a circular hole 15 to constitute a bearing for the trunnion of the shade roller and being provided at its other side with a slot or socket 16 to receive and hold the gudgeon.

All of the maps are of course different and are chosen in accordance with the wishes of the driver. It is readily conceivable that when new cars are sold they may be equipped with a set of shades having thereon maps of those states near the one in which the car is sold. It is also readily apparent that prior to making a tour or taking an extended trip the owner of the car may supply himself with a set of shade maps of the different states through which he expects to pass. As the maps are intended to be interchangeable for location at any of the windows it is readily apparent that any selected map may be removed from any location in the car and placed at the left front window so as to be convenient to the driver. In its simplest form the invention contemplates providing these shade maps on common ordinary shade rollers.

In order that my scheme may be carried out advantageously where there are differences in the dimensions of the windows, I may find it expedient to provide specially constructed spring rollers which are automatically extensible and which will therefore be capable of mounting in pairs of brackets different distances apart. As an ordinary telescopic roller presents some difficulties in its use, particularly as regards the securing of a shade upon relatively movable sections, I prefer to resort to the expedient or construction disclosed in Figures 2 to 5 wherein I have illustrated a peculiarly formed shade roller which is automatically extensible to fit in different sized spaces. It should, however, be understood that it is within the purview of the invention to vary this construction and to substitute an equivalent means.

Referring to Figures 2 to 5 in detail, I have shown a very convenient structure in which the spring roller comprises an elongated sleeve 17 having a central bore 18 leading into counterbores 19 and 20 at the end. Slidable and non-rotatable within the counterbore 19 is a plunger 21 here represented as having longitudinally extending ribs or ridges 22 slidably engaging within corresponding grooves 23 in the wall of the counterbore. This plunger has its outer end provided with a trunnion 24 rotatably engageable within any ordinary bracket 11 or within the hole 15 in the special bracket 14 if such be used. At its inner end the plunger is formed with a reduced extension 25 which defines a shoulder 26 against which abuts one end of a coil spring 27 which is located within the counterbore 19 and which operates to urge the plunger 21 outwardly. Slidable and rotatable within the counterbore 20 is a plunger 28 which may be similar to the plunger 21 except that there are no ribs or ridges. At its outer end the plunger 28 carries a gudgeon 29 for engagement within any one of the regular brackets 12 or within the slot 16 of the special bracket, as the case may be, and at its inner end it is formed with a reduced extension 30 defining a shoulder 31 against which abuts the coil spring 32 located within the counterbore 20 and operating to urge the plunger 28 outwardly. The inner extremities of the extensions 25 and 30 are formed with apertured ears 33 within which are engaged the ends of a torsion spring 34. The shade map 13 is of course intended to be secured upon the sleeve 17 in any desired manner and is adapted to be wound upon or wrapped thereabout when not in use.

When ordinary shade rollers are used they are generally provided with the usual ratchet and pawl mechanism and such may also be provided on the modified roller shown in Figure 2 though it is not illustrated as being so extremely well known in the art.

In the use of this modified form of roller, it is of course apparent that the shade map 13 which is secured to the sleeve 17 is initially wound upon it. The roller is placed in position by engaging the trunnion 24 within the bracket 11 or 14 and the gudgeon 29 within the bracket 12 or 14 at the top of the window at the left of the driver. Of course the device can be mounted at any of the other windows equally as well but at the left front window is the location where its use is needed. Assuming that the shade is rolled up, when the operator wishes to inspect the map he grasps whatever pull cord 35 may be provided and simply pulls down on the shade whereupon the sleeve 17 rotates as the shade unwinds. In view of the fact that the gudgeon 29 holds the plunger 28 and one end of the spring 34 stationary and in view of the fact that the sleeve 17 is keyed or splined onto the plunger 21, it is clear that the latter will rotate with the former so that the spring 34 will be twisted or placed under torsion. When the driver finishes inspecting the map he merely lets go of the pull cord whereupon the natural tendency of the spring 34 to resume its normal position will cause the sleeve 17 to rotate in the proper direction to rewind the shade. It is intended that the springs 27 and 32 be considerably heavier than the torsion spring 34 so that when the latter is twisted it will not operate to retract the plungers 21 and 28. If the pawl and ratchet mechanism be provided the shade can be left down at any window where it may be placed. A great feature of importance in the modified roller shown in Figures 2 to 5 is that as the plungers 21 and 28 are always urged outwardly by the springs 27 and 32 the roller may be considered as automatically extensible so that it may be readily mounted within shade brackets different distances apart so that the device may be used advantageously even though there may be noticeable differences in the distances between the pairs of brackets in a car or between the brackets in different makes of cars, styles of bodies, etc.

From the foregoing description and a study of the drawing it will be apparent that I have thus provided an extremely simple and inexpensive scheme by means of which road maps and the like may be kept easily available for consultation, the idea involving no additional expensive equipment. In the actual commercialization of the invention it is readily conceivable that maps of all the states or portions thereof may be manufactured and sold mounted upon the spring rollers, particularly the extensible variety so that one contemplating a trip may avail himself in advance of all the maps which may be needed. Various details will of course suggest themselves and it is believed that the entire invention as disclosed will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a device of the character described, a shade roller provided at its ends with outwardly spring pressed plungers, one terminating in a trunnion and the other in a gudgeon, the first named plunger having a slidable and non-rotatable connection with the roller, and torsion spring means connecting the inner ends of the plungers.

2. A shade roller comprising a sleeve having a bore leading into counterbores at the ends, an outwardly spring pressed plunger slidably and non-rotatably engaged within one counterbore and terminating in a trunnion, an outwardly spring pressed plunger slidably and rotatably engaged within the other counterbore and terminating in a gudgeon, said plungers being provided at their inner ends with reduced extensions terminating in apertured ears, and a torsion spring connecting said ears.

JOSEPH MORICCA.